Sept. 2, 1952 — G. E. HULSTEDE — 2,609,422
INDICATING DEVICE

Filed July 9, 1945 — 2 SHEETS—SHEET 1

INVENTOR.
GEORGE E. HULSTEDE
BY
William D. Hall,
ATTORNEY

Sept. 2, 1952 G. E. HULSTEDE 2,609,422
INDICATING DEVICE

Filed July 9, 1945 2 SHEETS—SHEET 2

INVENTOR.
GEORGE E. HULSTEDE
BY

ATTORNEY

Patented Sept. 2, 1952

2,609,422

UNITED STATES PATENT OFFICE 2,609,422

INDICATING DEVICE

George E. Hulstede, Cambridge, Mass., assignor to the United States of America as represented by the Secretary of War Application July 9, 1945, Serial No. 604,069

2 Claims. (Cl. 175—183)

The present invention relates generally to electrical circuits and more particularly to indicators for determining the ratio of standing waves along conductors carrying high frequency currents.

It is well known that a match or mismatch of impedance between a radio frequency source and its load, may be determined by the standing wave ratio on the transmission line connecting them. The standing wave ratio is defined as the ratio of the value of voltage maxima to the value of voltage minima along a transmission line. When there is a perfect impedance match, there is no reflection from the end of the line, no standing waves, and this ratio is 1:1. Therefore, it is very desirable, while adjusting impedances, to be able to get an instantaneous determination of this ratio. The process of taking a series of readings and plotting a curve therefrom for every adjustment of impedance makes accurate impedance matching a lengthy operation.

In the prior art the general practice to determine standing wave ratio has been to measure the voltage at various points along the transmission line by a probe that can be inserted in that line at the individual points where measurements are made. The probe contains a rectifier and the resulting rectified direct current voltage is measured by a direct current voltmeter. Readings must be taken at sufficient points along the line to permit a representative curve to be plotted. This means that sufficient readings must be taken to make it certain that both points of maximum and minimum voltage have been included while the readings must be closely enough spaced to insure accuracy.

It is an object of the present invention to provide apparatus in which no manual adjustments are necessary and by which a complete picture of the voltage characteristic along the transmission line or any desired portion thereof is visually indicated as a single complete picture. Thus, adjustment for impedance matching may be made with great rapidity and accuracy.

A further advantage of the invention is that it provides by the same visual indication a continuous measurement of the relative magnitude of the radio frequency power in said transmission line.

The instantaneous voltage indication along a transmission line is accomplished by arranging the transmission line in a generally circular configuration and driving at a high rate of speed a probe in the field of a substantial portion of said transmission line and rectifying by a crystal the energy picked up by the probe as it travels through the field of the transmission line. Voltage fluctuations at the operating frequency are by-passed to ground and the rectified direct current potential fluctuations are reproduced on an oscilloscope. The image in the oscilloscope represents variations in field strength along the transmission line and therefore variations in voltage along that line.

Where it is not practical to place the transmission line to be measured in the desired circular arrangement, a matched line may be used with the apparatus and connected in the line under observation at either end or at any point along that line.

Other features of this invention will become apparent from the following description of the invention taken in connection with the accompanying drawings in which.

Figure 1:
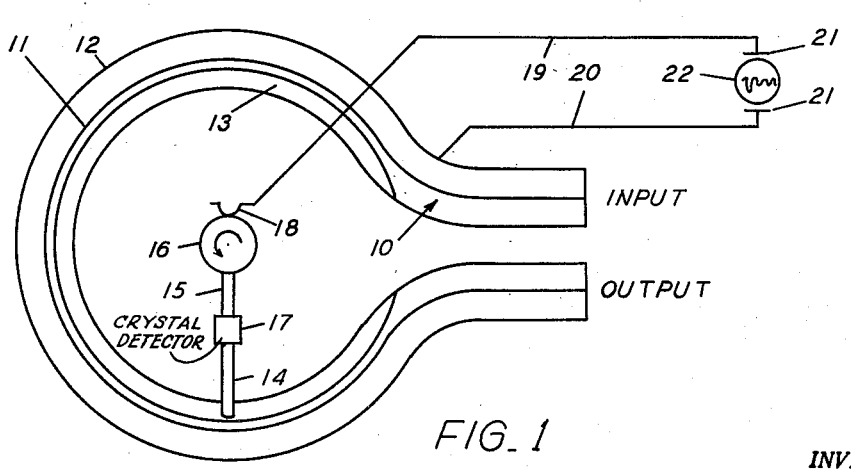
Fig. 1 is a schematic circuit diagram of apparatus embodying the principles of this invention.
Figure 3:
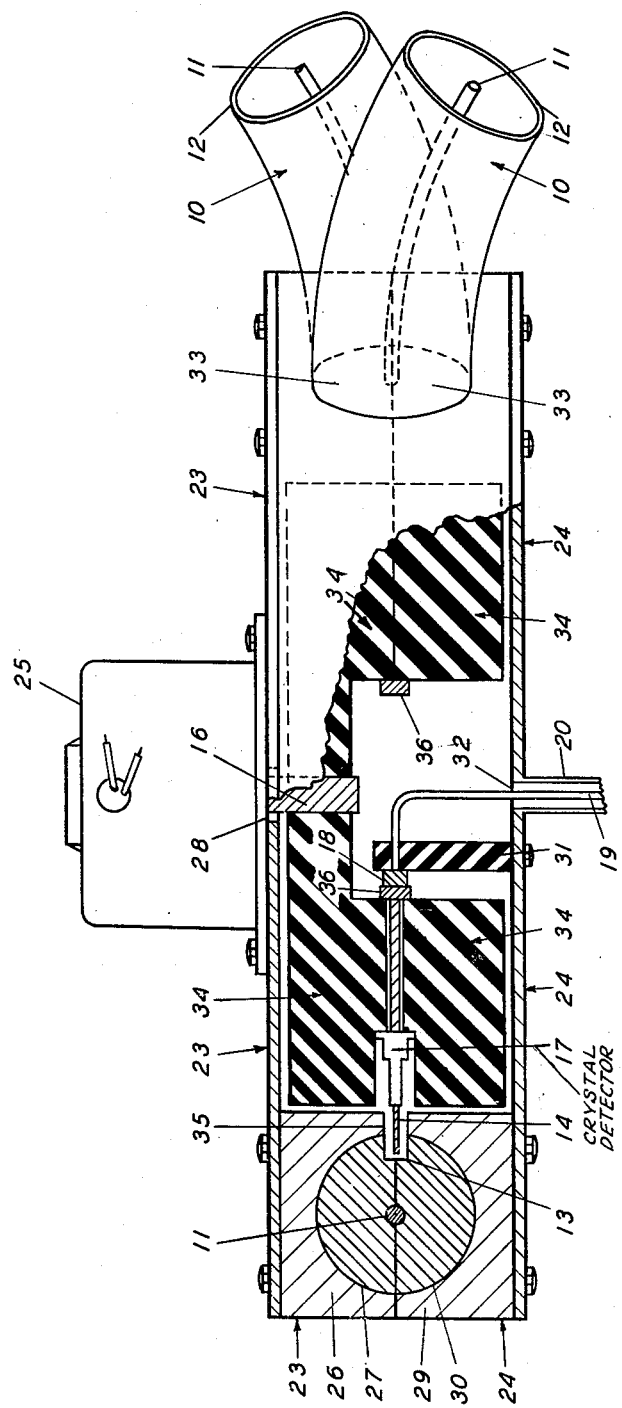
Fig. 3 is an elevation in partial cross-section of a preferred apparatus applying the principles of circuit shown in Fig. 1.

Referring now to Fig. 1, the concentric transmission line 10, consisting of inner conductor 11 and outer conductor 12, over which the standing wave ratio is to be measured is disposed in a circular arrangement for substantially its entire length with its terminals connected to an input and an output. The mechanical details of holding this are shown in Fig. 3, but for purposes of explanation of the present electrical principles of the invention the diagrammatic representation in Fig. 1 is sufficient. A slit 13 which extends for the entire circular portion is provided on the inside diameter of outer conductor 12. This slit is large enough to admit a probe 14 consisting of a conductive point mounted on rotating arm 15 which in turn is mounted on rotating shaft 16. Shaft 16 is driven by a synchronous motor of conventional design which is not shown. Connected in arm 15 is a crystal rectifier whose case 17 may form an integral mechanical part of arm 15 but which is electrically insulated from probe 14. Brush 18 contacting a portion of shaft 16 insulated from the rest of the shaft and conductors 19 and 20 connect the vertical deflecting plates 21, 21 of an oscilloscope across the shaft 16 and outer conductor 12.

In operation 14 is driven to rotate at a rate of speed, say about 1800 R. P. M., chosen with relation to the sweep frequency of the oscilloscope used.

Probe 14 passes through the electrostatic field between inner conductor 11 and outer conductor 12 for that length of transmission line 10 over which slit 13 extends. A continuously varying alternating voltage is developed on probe 14 proportional to the difference in voltage between inner conductor 11 and outer conductor 12. This voltage varies with the operating frequency modulated by the voltage variation caused by reflection from the end of the line. The voltage on probe 14 is rectified by a suitable crystal rectifier in holder 17 and the operating frequency component is by-passed so that the voltage fed by arm 15 to vertical deflection plates 21, 21 of oscilloscope 22, represents the voltage fluctuation along line 10 due solely to standing waves. A representation of these fluctuations will appear on the screen of oscilloscope 22.

Figure 2:
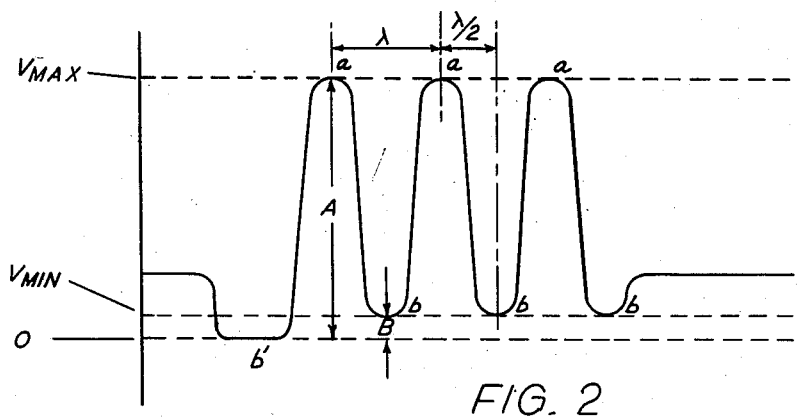
Figs. 2 and 2a are representations of images obtained by the apparatus.
Figure 2A:
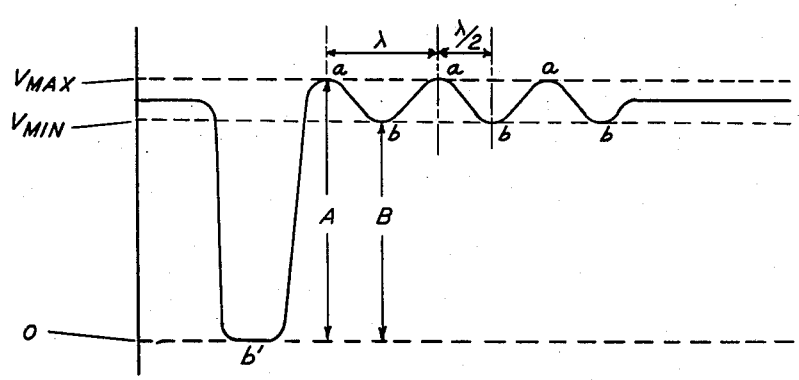

In Figs. 2 and 2a representations of specimen oscilloscope traces obtained by apparatus employing the present invention are reproduced. The trace in Fig. 2 is that obtained when the impedance of the line on which the standing wave ratio is being measured is not matched to the input impedance and the standing wave ratio is high. As probe 14 passes through the electrostatic field between inner and outer conductors points of maximum voltage $a$, $a$, $a$ will occur at points spaced apart by a distance representing the wavelength of the operating frequency.

The distance along the line 10 will be shorter physically than the actual wavelength because the waves do not travel as fast along the line as they do in free space. The amount of this shortening will depend upon the material of the conductors and the dielectric constant of the dielectric separating them. In many concentric transmission lines this dielectric is air but, as later explained, a dielectric with a higher dielectric constant may be used in order to shorten this distance and obtain a larger number of maximum points on the oscilloscope for a given physical length of line.

Midway between maximum points $a$, $a$, $a$ there will occur points of minimum voltage $b$, $b$, $b$. Points $b$, $b$, $b$ likewise represent points on line 10 separated by the wavelength of the operating frequency. Each point $b$ is one-half a wave-length away from its neighboring point $a$. The standing wave ratio is the ratio of the distance A of the maximum points $a$, $a$, $a$ from the zero reference line "0" of the oscilloscope to the distance B of the minimum points $b$, $b$, $b$ to that reference line. It is seen in Fig. 2 that this ratio is relatively large, and, therefore, that the impedance match is poor.

Referring now to Fig. 2a, there is shown the oscilloscope trace to be expected when the impedance match is good. It is to be noted that the points of minimum voltage $b$, $b$, $b$ are nearly as high as the maximum points $a$, $a$, $a$ and therefore the ratio of distance A to distance B approaches unity. In a theoretically perfect case, there would be no maximum or minimum points, after the first surge when the probe 14 enters the field and the standing wave ratio would be unity.

After indication of a good impedance match has been obtained, relative power passing through the transmission line may be indicated by the magnitude of the first minimum voltage dip $b'$ occurring as probe 14 in each revolution enters slit 13 and the field between the conductors of the line.

In practice it may not be convenient to arrange the line in which it is desired to measure the standing wave ratio in the circular formation shown in Fig. 1 or to slit it to allow travel of probe 14. In such cases, a standard transmission line matched to the line on which the standing wave ratio is to be measured may be connected at either end or anywhere along the line to be measured and the standing wave ratio in the standard line may be measured as above. Since the line to be measured and the standard line are matched there is no discontinuity between them and therefore no reflection. It follows that the standing wave pattern in the line to be measured will be the same as that in the standard line.

In order to make a device embodying the principles of this invention useful for measurement of transmission lines having varying impedances, either of two procedures may be used. A set of standard transmission lines of different characteristic impedances which are the same as the characteristic impedances most frequently encountered in the lines to be measured may be made up and inserted in the holding device as desired. The number of such standard lines needed is dictated by practical consideration of use. The second procedure is to have one standard line having a characteristic impedance frequently encountered and connecting between it and the line to be measured a balancing impedance one-quarter of the operating wavelength for the frequency of operation. The value of this balancing impedance may be determined from the well known relationship that it should be the square root of the product of the characteristic impedances of the standard line and the line to be measured.

A preferred physical embodiment of the invention is shown in detail in Fig. 3. This embodiment comprises a holder with its associated apparatus which may be used to measure the standing wave ratio directly on the line to be investigated but which, in the drawing, is shown with a standard line inserted in it for use as described above. The holder which is in two sections—an upper half 23 and lower half 24—is of circular shape. Mounted on the upper half is a synchronous motor 25.

The upper section consists of an outer annular portion 26 which may be formed of any suitable conducting material such as brass or copper and which is formed to a semicircular portion 27 into which the upper half of the insulating material of concentric line 10 fits. This annular portion 26 thus acts as the upper half of the outer conductor of line 10. An aperture 28 is provided at the center of section 23 through which shaft 16 of motor 25 passes. The lower half 24 has a similar outer annular portion 29 shaped at 30 to accommodate the lower half of the dielectric of line 10. The portion 29 acts as half of the outer conductor of line 10. The central portion of the lower half provides space for a rotating member on shaft 16 to be described more in detail. The lower half near its center also carries an insulated support 31 for a stationary brush 18 and has an outlet aperture 32 for the conductors leading from that brush.

Semicircular openings 33 are provided in the upper and lower sections through which the ends of the dielectric and inner conductor 11 of line 10 are brought out for connection to other apparatus.

Connected to and rotating with shaft 16 is a member 34 in which are mounted the probe, crystal, slip rings and their associated connections. Probe 14 is mounted at the circumference of member 34 and extends sufficiently beyond that circumference to extend through a cutaway portion 35 of annular portions 26 and 29 and into a slit 13 provided in the dielectric of line 10. Probe 14 is connected to crystal rectifier 17 mounted in a space in member 34. The other contact of crystal rectifier 17 is connected to slip ring 36 mounted in member 34. The member 34 may be made of any suitable insulating or dielectric material or, if desired, may be made of a suitable electrically conductive material. If member 34 is made conductive, a means (not shown) should be provided for insulating crystal rectifier 17, slip rings 36 and their associated connections from member 34.

Contact with slip ring 36 is made by stationary brush 18, supported by insulated support 31. Conductors 19 and 20 lead to the waveform indicating device.

The accuracy of the apparatus is affected by any deviation in the path travelled by probe 14. Therefore, care should be taken to provide accurately ground bearings for shaft 16. It is also advisable to have rotating member 34 of sufficient mass to reduce vibration and have flywheel effect.

In practice there are generally sufficient leakage paths to ground so that all radio frequency components present in the measuring circuit after rectification leak off and do not appear on the oscilloscope. However, as an added precaution, a capacitor may be inserted anywhere in the connection after the crystal to provide such a leakage path.

While there has been described what is at present considered to be the preferred embodiment of the invention, it will be obvious to those skilled in the art that various changes and modifications may be made therein without departing from the scope of the invention.

What is claimed is:

1. Apparatus for indicating the standing wave ratio in a concentric transmission line having between its inner and outer conductors a dielectric of high dielectric constant comprising a circular holder for said line comprising a top part and a bottom part, said top part including an annular portion formed to receive the upper half of said line and a portion for supporting a synchronous motor, said lower part including a generally similar annular portion for receiving the lower half of said line, a base plate portion, with a central opening for a conductor, said top part extending less than a complete circle to provide a space for connection to the terminals of said line, a portion of the inner wall formed by the annular portions of said top and bottom parts cut away to permit physical access to said line, a synchronous motor mounted on said upper part and having a downwardly extending shaft, a rotatable part mounted on said shaft and extending to said annular portions, an electric probe mounted within said rotatable part and disposed to extend through the cut away portion of the inner wall formed by the annular portions of said top and bottom parts and extending through a longitudinal aperture in the outer conductor of said line and into the dielectric between said outer conductor and the inner conductor, said probe extending at its other end into a cavity formed in said rotatable part and a rectifying crystal mounted in said cavity in electrical contact with said probe, a conductor connecting said crystal to a slip ring mounted on said shaft, a brush mounted on the base plate portion of said lower part contacting said slip ring, and a conductor from said brush extending through the central opening in the lower part provided therefor to indicating means, the mass of said annular portion being sufficiently large to produce a flywheel effect.

2. In apparatus for indicating the standing wave ratio in a concentric transmission line, a holder for said transmission line comprising corresponding first and second annular metallic rings, each of said rings having first and second portions cut away therefrom, which are respectively concentric with the axis of said ring, the cross-section of said first cutaway portion being semi-circularly shaped with its diameter lying on a radially disposed peripheral edge of said ring, the cross-section of said second cut-away portion forming a notch along said radially disposed peripheral edge extending from the inner circumference of said ring to said first cut-away portion, and means for removably mounting said first and second rings with the respective axes and said radially disposed peripheral edges of said rings coinciding, the first cutaway portions of both rings together forming an enclosure for said transmission line and the second cutaway portions of both rings together forming a notch adapted to receive a probe which is rotatable about the common axis of said rings.

GEORGE E. HULSTEDE.

REFERENCES CITED

The following references are of record in the file of this patent:

UNITED STATES PATENTS

| Number | Name | Date |
| --- | --- | --- |
| 2,400,597 | Peterson | May 21, 1946 |

OTHER REFERENCES

"Practical Analysis of Ultra High Frequency," by Meagher and Markley, pages 12 and 13. Published by RCA Service Co., Inc., Camden, New Jersey.